Sept. 28, 1971  E. E. SCHMIDT  3,608,409

CATERPILLAR MICRO POSITIONER

Filed Sept. 24, 1969

INVENTOR
EWALD E. SCHMIDT

BY

ATTORNEYS

United States Patent Office 3,608,409
Patented Sept. 28, 1971

3,608,409
CATERPILLAR MICRO POSITIONER
Ewald E. Schmidt, Lanham, Md., assignor to the United States of America as represented by the Administrator of the National Aeronautics and Space Administration
Filed Sept. 24, 1969, Ser. No. 860,493
Int. Cl. B23b 21/00
U.S. Cl. 82—24R       1 Claim

ABSTRACT OF THE DISCLOSURE

This disclosure describes a caterpillar micro positioner for use in an aspherical or other similar machine. The micro positioner includes front and rear sliding holders and an electromechanical or other incremental driver. The driver connects the front and rear sliding holders and incrementally moves one holder with respect to the other holder. An outwardly extending tool is attached to the front holder. Electromagnetic holding means are held in each of the sliding holders and alternately energized to hold one of the holders in a fixed position while the other holder is moved. In addition, a flex ring is provided and coupled to the front and rear holders so as to place the driver under compression, thereby eliminating slack or play from the various mechanical interconnections between the driver and the holders and from the driver per se.

ORIGIN OF THE INVENTION

The invention describe herein was made by an employee of the United States Government and may be manufactured and used by or for the Government for governmental purposes without the payment of any royalties thereon or therefor.

BACKGROUND OF THE INVENTION

This invention is directed to positioners and more particularly to micro positioners for positioning a machine tool adjacent to a workpiece.

Positioners for positioning machine tools adjacent to workpieces are well known. They range from simple screw thread systems used with conventional metal lathes to complex electro-mechanical systems for use in aspheric and the like machines. An aspheric machine is a machine that creates solid objects that do not have a constant rate of curvature, as do the objects that are created by a spheric machine. Because of the varying rate of curvature of the object, an aspheric machine requires tool and/or object movement along three axes as opposed to movement along two axes. Because the object can be easily moved along only two axes, an aspheric machine requires tool movement along at least one axis.

While prior art positions have found widespread use in various machine operations, they have not been entirely satisfactory, particularly when used with aspheric machines. More specifically, as technology, particularly space and other remote environment technology, has involved the requirement for more and more precisely machined and prepared parts has become greater. The stringent part or object requirements have resulted in the necessity for the creation of precision tool positioners with accuracies in the micro inch range. While positioners that are accurate to within this range have been developed, certain unresolved problems remain. For example, the majority of the recently developed micro positioners have a very limited range of movement, such as 300 micro inches. If feedback control is used with these devices, their range can be extended, however, at the expense of losing continuity and/or contact with the surface of the workpiece. Moreover, the linearity of movement of many prior art micro positioners is not as good as it could be.

Therefore, it is an object of this invention to provide a new and improved micro positioner.

It is a further object of this invention to provide a micro positioner that is accurate over a relatively wide range.

It is yet another object of this invention to provide a micro positioner suitable for use in an aspheric machine that is accurate over a wide range and moves in essentially linear micro inch increments.

SUMMARY OF THE INVENTION

In accordance with principles of this invention, a caterpillar micro positioner is provided. The micro positioner of the invention comprises front and rear sliding holders connected by a mechanical, electrical or other driver. The driver is operable to incrementally move one sliding holder with respect to the other sliding holder. The front sliding holder includes means for supporting a tool in a work position. A holding means is mounted in each of the sliding holders so that the holders can be alternately held in fixed positions with respect to a base track. In operation, the rear sliding holder is locked in place by energizing its holding means and the front sliding holder is allowed to move by deenergizing its holding means. The driver is actuated by a suitable actuating means and advances the front sliding holder and its attached tool in increments of one micro inch or more, as desired, until the range of the driver is exhausted. Thereafter, the energization and deenergization of the holding means is reversed to allow the rear sliding holder to move while the front sliding holder is locked in place. The driver is then actuated to advance the rear sliding holder a distance which is usually equal to the advancement of the front sliding holder. Thereafter, the entire cycle is continuously repeated until the desired amount of tool movement is achieved.

In accordance with a further principle of this invention, a flex ring is provided and connects the front and rear sliding holders so as to apply a predetermined amount of compression force on the driver thereby eliminating slack or play in the driver, and between the driver and the front and rear sliding holders.

In accordance with a further principle of this invention, the driver is a piezoelectric driver formed of a plurality of piezoelectric sections which expand or contract in accordance with well known principles as applied electrical energy is increased or decreased.

It will be appreciated from the foregoing description that the invention provides a caterpillar micro positioner suitable for operation over a relatively unlimited range. That is, the range of the invention is only limited by the length of the track over which the front and rear sliding holders move. The invention is accurate in the micro inch range because of the utilization of a driver that can be incrementally energized in that range. Moreover, the flex ring embodiment provides exceptionally highly linear operation because of the application of a compressive force that eliminates slack and play in the overall system.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENT

Figure 1:
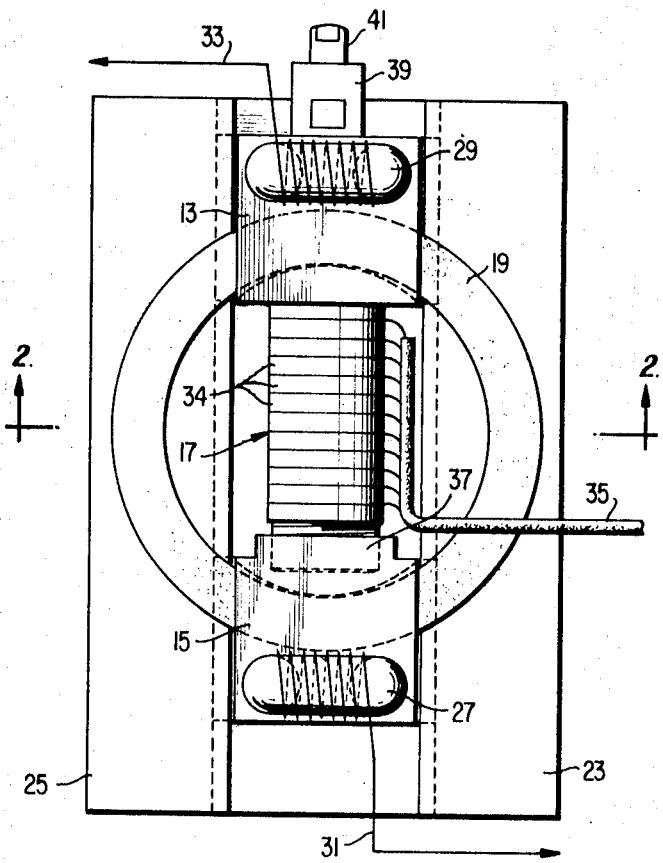
FIG. 1 is a top view of a preferred embodiment of the invention.
Figure 2:
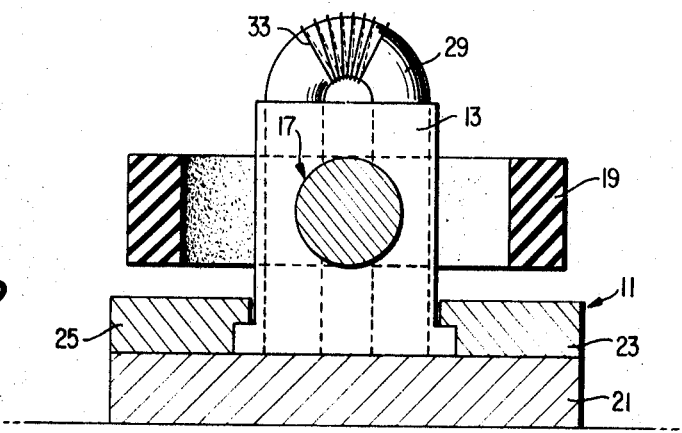
FIG. 2 is a cross sectional view along line 2—2 of FIG. 1.

The embodiment of the invention illustrated in the drawings comprises: a base track 11; a front sliding holder 13; a rear sliding holder 15; a piezoelectric driver 17; and, a flex ring 19. The base track 11 is best illustrated in FIG. 2 and comprises a ferro magnetic base section 21; and two side rails 23 and 25. The side rails 23 and 25 are mounted on the base section 21 in parallel and have inwardly projecting lips adjacent on their upper surfaces so that a generally inverted T-shape cross sectional aperture is formed.

The front and rear sliding holders 13 and 15 are generally similar and are essentially inverted T-shapes in cross section so as to fit in the aperture between the lips of the side rails 23 and 25. In this manner, the front and rear sliding holders 13 and 15 are formed so as to be moveable along the base track 11. While not shown, it will be appreciated by those skilled in the art and others that any suitable means can be used to allow freedom of movement between the front and rear sliding holders and the base track 11, such as oil lubrication, bearings or air suspension, for example.

The legs of an inverted U-shaped rear electro-magnet 27 pass through a pair of vertical cylindrical apertures in the rear sliding holder 15. Similarly, the legs of an inverted U-shaped front electro-magnet 29 pass through a pair of vertical cylindrical apertures in the front sliding holder 13. Wires 31 and 33, respectively, are wound about the front and rear electro-magnets 27 and 29 so that electric power can be applied to create electro-magnetic action. It will be appreciated by those skilled in the art and others that when either the front or the rear electro-magnet is energized, it holds its respective sliding holder at the energized position due to conventional magnetic interaction between the ferro magnetic base section 21 and the energized electro-magnet.

The flex ring 19 is a cylindrical ring formed of a highly tensile, but flexible, material (such as "hard" rubber) and has a rectangular cross section as illustrated in FIG. 2. The flex ring passes through suitably formed semi-arcuate (rectangular in cross section) apertures in the front and rear sliding holders 13 and 15. As will be better understood by the following description, the flex ring is adapted to apply compressive pressure to the piezoelectric driver 17, hence, it does not necessarily have to be rectangular in cross section, nor does it have to be a cylindrical ring. For example, a pair of coil springs (or even one attached between the sliding holders could be used in place of the flex ring.

The piezoelectric driver 17 is, preferably, formed of a plurality of cylindrical piezoelectric sections 34 axially aligned between the front and rear sliding holders 13 and 15. A wire from a position control circuit (not shown) is connected to each cylindrical piezoelectric section 34 via a cable 35 so that each individual piezoelectric section can be separately energized in an incremental manner. One end of the piezoelectric driver 17 impinges on the back face of the front sliding holder 13. The other end of the piezoelectric driver 17 is attached via a compression adjustment screw 37 to the front face of the rear sliding holder 15. The compression adjustment screw 37 can be rotated in any suitable manner such as by passing a screw driver through an aperture in the rear sliding holder between the legs of the rear electro-magnet to reach a slot in the end of the compression adjustment screw.

A tool holder 39 projects outwardly from the front face of the front sliding holder 13. A tool 41 is mounted on the outer end of the tool holder 39.

Preferably, the flex ring applies a considerable amount of force, such as 5,000 lbs., for example, to the piezoelectric driver 17 along the longitudinal axis formed between the front and rear sliding holders 13 and 17. This force is created by applying a deforming tension force against the flex ring at right angles to the longitudinal axis formed between the front and rear sliding holders. Any suitable means can be used to create this force. As the side force is applied, the compression adjustment screw 37 is rotated to counteract the side force and maintain the flex ring cylindrical in shape until the desired amount of pressure has been applied. The side force is then released and the flex ring deforms to apply a compressive force on the driver. By applying a compressive force of this nature to the piezoelectric driver, slack or play between the driver sections and between the driver and the front and rear sliding holders is virtually eliminated. Because energization of the sections of the piezoelectric driver only increases the five thousand lbs. of force by an additional 20 or 30 lbs., linearity of tool movement is also achieved.

The invention is operated in the following manner, the rear sliding holder 15 is locked in place by energizing the rear electro-magnet 27. At the same time, the front electro-magnet 29 is deenergized, thereby allowing the front sliding holder 13 to move. The piezoelectric driver sections are then sequentially activated by a suitable electrical control circuit as is well known in the art. Each sequential activation causes an increment expansion of the driver which incrementally moves the front sliding holder 13 and its attached tool 41 a predetermined amount, such as one micro inch, for example. When the practical range of the driver is exhausted (approximately 200 to 300 micro inches), the front electro-magnet 29 is energized to hold the front sliding holder at the exhausted position and the rear electro-magnet 27 is deenergized to free the rear sliding holder 15. The piezoelectric driver is then activated in reverse and the rear sliding holder 15 advances the distance that the front sliding holder 13 previously advanced. Because of the nature of a piezoelectric driver, advancement of the rear sliding holder may be accomplished in one increment by merely switching the polarity of the applied voltages. Thereafter, the entire cycle is continuously repeated until the tool has advanced as far as desired.

It will be appreciated by those skilled in the art and others that the invention provides a micro positioning device suitable for use with an aspheric or similar machine that will move a tool in increments as low as one micro inch. While the distance of movement per increment is small, the invention can operate over a relatively wide range due to its caterpillar action. The entire range can be covered without ever removing the tool from the workpiece. Hence, the invention provides continuous tool advancement in predetermined increments over a relatively unlimited range. If desired, feedback control can be provided, however, it is not necessary to the successful operation of the invention.

It will also be appreciated by those skilled in the art and others that various modifications can be made within the scope of the invention depending upon the accuracy and linearity desired for a particular use of the invention. For example, while a piezoelectric driver has been illustrated because it has been found to be the most accurate driver suitable for use with the invention, other drivers can be utilized. For example, the driver can be hydraulic or mechanical in nature. Moreover, it can be a thermal expansion device. In addition, it will be appreciated by those skilled in the art and others that the flex ring can be eliminated if desired because, as previously stated the flex ring increases the accuracy and linearity of the invention, but is not absolutely necessary to its successful operation. Hence, it can be eliminated if accuracy and linearity can be sacrificed. Therefore, the invention can be practiced otherwise than as specifically described herein.

What is claimed is:
1. A caterpillar micro positioner comprising:
 (a) a base track formed of ferromagnetic material;
 (b) a front sliding holder slideably mounted on said base track;
 (c) a rear sliding holder slideably mounted on said base track;
 (d) holding means attached to said front and rear sliding holders for holding one of said front and rear sliding holders in a fixed position with respect to the other of said front and rear sliding holders while allowing the other sliding holder to move, said holding means including a first electromagnet attached to said front sliding holder and a second electromagnet attached to said rear sliding holder;
 (e) driving means mounted between said front and rear sliding holders for moving one of said front and rear sliding holders with respect to said other sliding holder, said driving means including a piezoelectric driver comprising a plurality of piezoelectric sections connected so as to be individually energized;
 (f) compression means connected between said front and rear sliding holders so as to apply a compression force to said piezoelectric driver and eliminate slack between the holders and the driving means;
 (g) a compression adjustment screw coupling said rear sliding holder to said piezoelectric driver to adjust the compression force on said piezoelectric driver, and;
 (h) a tool holder mounted on said front sliding holder on the opposite side from said driving means and projecting outwardly therefrom and further including a tool mounted in said tool holder.

References Cited
UNITED STATES PATENTS

| | | | |
|---|---|---|---|
| 2,506,141 | 5/1950 | Drouin | 310—26X |
| 2,930,912 | 3/1960 | Miller | 310—26 |
| 3,104,349 | 9/1963 | Stevens | 310—26X |
| 3,138,749 | 6/1964 | Stibitz | 310—26X |
| 3,233,749 | 2/1966 | Devol | 310—26X |
| 3,349,304 | 10/1967 | Wachter | 310—26X |
| 3,377,489 | 4/1968 | Brisbane | 310—26X |
| 3,389,274 | 6/1968 | Robertson | 310—8.3X |
| 3,504,582 | 4/1970 | Klee et al. | 82—24 |

LEONIDAS VLACHOS, Primary Examiner

U.S. Cl. X.R.

310—26, 8, 8.7